(12) United States Patent
Chang et al.

(10) Patent No.: US 12,447,432 B2
(45) Date of Patent: Oct. 21, 2025

(54) SWITCHABLE TWO-STAGE COALESCENCE SEPARATION SYSTEM

(71) Applicant: China University of Petroleum-Beijing, Beijing (CN)

(72) Inventors: Cheng Chang, Beijing (CN); Zhongli Ji, Beijing (CN); Xiaolin Wu, Beijing (CN); Zhen Liu, Beijing (CN); Feng Chen, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 400 days.

(21) Appl. No.: 18/153,598

(22) Filed: Jan. 12, 2023

(65) Prior Publication Data
US 2023/0173424 A1   Jun. 8, 2023

Related U.S. Application Data

(63) Continuation of application No. PCT/CN2021/137428, filed on Dec. 13, 2021.

(30) Foreign Application Priority Data

Mar. 11, 2021   (CN) .......................... 202110264220.5

(51) Int. Cl.
*B01D 46/00*   (2022.01)
*B01D 46/24*   (2006.01)
(Continued)

(52) U.S. Cl.
CPC ..... *B01D 46/0031* (2013.01); *B01D 46/0005* (2013.01); *B01D 46/2403* (2013.01);
(Continued)

(58) Field of Classification Search
CPC ............ B01D 46/0031; B01D 46/0005; B01D 46/2403; B01D 46/58; B01D 46/62;
(Continued)

(56) References Cited

U.S. PATENT DOCUMENTS 3,349,547 A * 10/1967 Hoipkemeier ......... B01D 50/00
                                                                  55/447
3,888,644 A *  6/1975 Holland ................. B01D 46/00
                                                                  55/318
(Continued)

FOREIGN PATENT DOCUMENTS

CN   101421762 A   4/2009
CN   101663076 A   3/2010
(Continued)

OTHER PUBLICATIONS

International Search Report for Application No. PCT/CN2021/137428, dated Mar. 1, 2022, 2 pgs.
(Continued)

*Primary Examiner* — T. Bennett Mckenzie
(74) *Attorney, Agent, or Firm* — Young Basile Hanlon & MacFarlane, P.C.

(57) ABSTRACT

A switchable two-stage coalescence separation system, including a coalescer housing, a plurality of two-stage filter elements, and a particle detector. A lower portion and an upper portion of each of the two-stage filter elements are located in a lower chamber and an upper chamber of the coalescer housing, respectively. Two gas inlet branch pipes are communicated with the lower chamber and the upper chamber, respectively and are connected to a gas inlet main pipe through a first multi-way valve. The particle detector is disposed on the gas inlet main pipe. Two outlet branch pipes are communicated with the lower chamber and the upper chamber, respectively and are connected to a gas outlet main pipe through a second multi-way valve.

10 Claims, 9 Drawing Sheets

(51) Int. Cl.
*B01D 46/58* (2022.01)
*B01D 46/62* (2022.01)

(52) U.S. Cl.
CPC ............ *B01D 46/58* (2022.01); *B01D 46/62* (2022.01); *B01D 2265/029* (2013.01); *B01D 2265/06* (2013.01); *B01D 2271/022* (2013.01)

(58) Field of Classification Search
CPC .......... B01D 2265/029; B01D 2265/06; B01D 2271/022; B01D 2271/027; B01D 46/003; B01D 46/442; B01D 46/0002; B01D 46/0027; B01D 46/42; B01D 46/4272; B01D 46/543; B01D 46/56; B01D 46/70; B01D 46/88; C10L 3/101; C10L 3/106
USPC .......................................................... 55/484
See application file for complete search history.

(56) References Cited

U.S. PATENT DOCUMENTS

| | | | | |
|---|---|---|---|---|
| 4,297,116 | A * | 10/1981 | Cusick | B01D 46/0031 55/528 |
| 5,516,434 | A | 5/1996 | Cairo, Jr. et al. | |
| 5,919,284 | A * | 7/1999 | Perry, Jr. | B01D 45/02 55/482 |
| 6,702,941 | B1 * | 3/2004 | Haq | B01D 46/005 210/493.1 |
| 7,108,738 | B2 * | 9/2006 | Burns | B01D 29/114 55/482 |
| 7,198,718 | B1 * | 4/2007 | Turnbull | C10G 33/06 210/DIG. 5 |
| 7,905,934 | B2 * | 3/2011 | Lersch | B01D 46/64 55/486 |
| 8,936,661 | B2 * | 1/2015 | Burns | B01D 46/2403 55/482 |
| 2003/0010205 | A1 * | 1/2003 | Bikson | B01D 63/031 95/52 |
| 2011/0259796 | A1 | 10/2011 | Chen et al. | |
| 2016/0317960 | A1 | 11/2016 | Chen et al. | |

FOREIGN PATENT DOCUMENTS

| | | | |
|---|---|---|---|
| CN | 103463894 | A | 12/2013 |
| CN | 106731330 | A | 5/2017 |
| CN | 107051016 | A | 8/2017 |
| CN | 107312582 | A | 11/2017 |
| CN | 107794098 | A | 3/2018 |
| CN | 108144374 | A | 6/2018 |
| CN | 207557062 | U | 6/2018 |
| CN | 108479268 | A | 9/2018 |
| CN | 108568171 | A | 9/2018 |
| CN | 208893780 | U | 5/2019 |
| CN | 209178341 | U | 7/2019 |
| CN | 209378571 | U | 9/2019 |
| CN | 110420517 | A | 11/2019 |
| CN | 111205897 | A | 5/2020 |
| CN | 210506242 | U | 5/2020 |
| CN | 210584170 | U | 5/2020 |
| CN | 111318103 | A | 6/2020 |
| CN | 111389128 | A | 7/2020 |
| CN | 211753192 | U | 10/2020 |
| CN | 111871076 | A | 11/2020 |
| CN | 111957159 | A | 11/2020 |
| CN | 212610478 | U | 2/2021 |
| CN | 112957834 | A | 6/2021 |
| TW | 202042890 | A | 12/2020 |
| WO | 9833578 | A1 | 8/1998 |
| WO | 2007080169 | A2 | 7/2007 |

OTHER PUBLICATIONS

Chinese Search Report for Application No. 202110264220.5, dated Oct. 13, 2021, with English translation, 14 pgs.
Yang Yunlan et al., XGF Combined Filter Separator, Petroleum Science and Technology Forum.
Y. Shi et al., Study of coalescence-induced droplet jumping during phase-change process in the presence of noncondensable gas, International Journal of Heat and Mass Transfer, Feb. 22, 2020.
Xiong Zhiyi et al., Measurement and analysis on influencing factors for filtration performance of filter coalesce element, CIESC Journal, vol. 63 No. 6.
Lilibeth Nino, Applicability of a modified breakage and coalesce nee model based on the complete turbulence spectrum concept for CFD simulation of gas-liquid mass transfer in a stirred tank reactor.
Lifeng Lu et al., Characteristic of Online Measurement for Particles in Gas Pipelines, The Chinese Journal of Process Engineering, vol. 17 No. 5.
V.S. Akella, Universal scaling laws in droplet coalesce nee: A dissipative particle dynamics study, Chemical Physics Letters, Dec. 31, 2020.
Xiao Lian et al., Performance Test of Filter Cartridge for Natural Gas Purification, China Petroleum Machinery, vol. 43 No. 12.
Ji Zhongli et al., Overview of hot-gas filtration technology and equipment development, Chemical Industry and Engineering Progress, vol. 39 No. 6.
Chang Cheng et al., Analysis of re-entrainment in process of gas-liquid filtration, CIESC Journal, vol. 66 No. 4.
Liu Jialin et al., Influence of Number of Coalescing Filter Layers on the Liquid Content in Filter Media, Journal of Engineering Thermophysics, vol. 38 No. 10.
Zheng Sijia et al., Operational characteristics of flter separators based on on-line particle monitoring experiments, Natural Gas Industry, vol. 40 No. 5.
Liu Jialin et al., Effects of Oil Concentration in Gas on Pressure Drop and Liquid Content of Oleophilic Coalescing Filters, Journal of Chemical Engineering of Chinese Universities, vol. 32 No. 2.
Liang Zheng et al., Performance evaluation of in-service natural gas separation and dedusting equipment, natural gas industry.
Liu Zhen et al., Detection on particulate matters in gas pipeline and assessment on separator performance, Oil and gas storage and transportation, vol. 35 No. 1.
Zhang Xiaodong et al., Principle and Application Of High Efficiency Liquid/Gas Coalescer, Petroleum Refinery Engineering, vol. 33 No. 1.

* cited by examiner

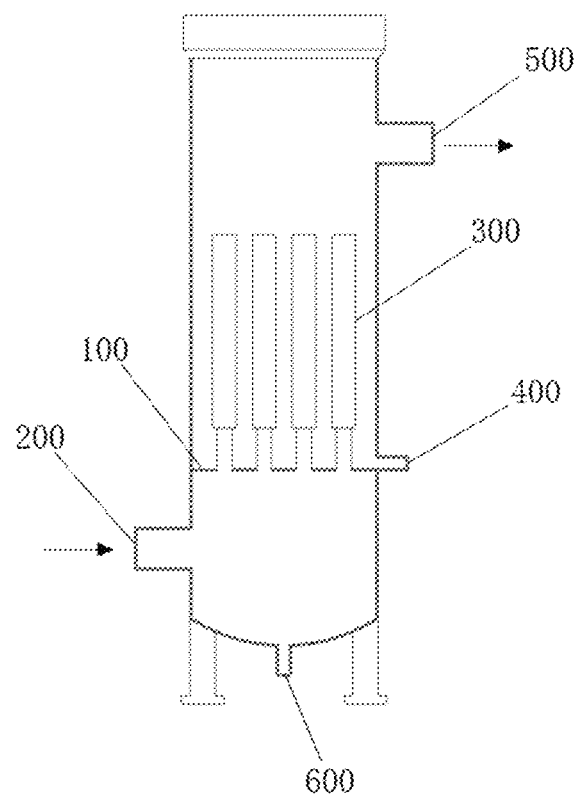
FIG. 1 --Prior Art--

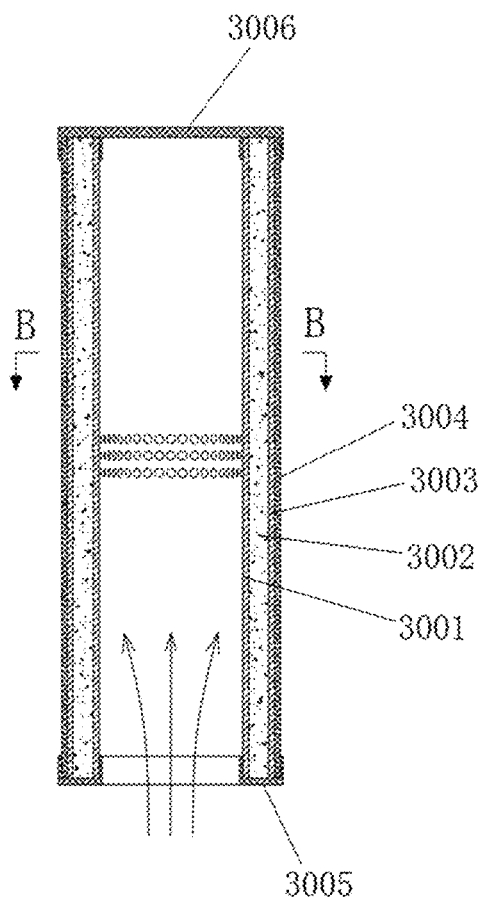
FIG. 2 --Prior Art--
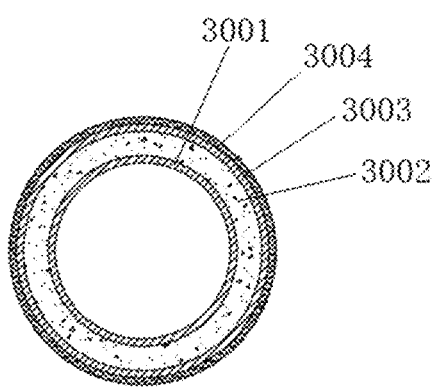
FIG. 3 --Prior Art--

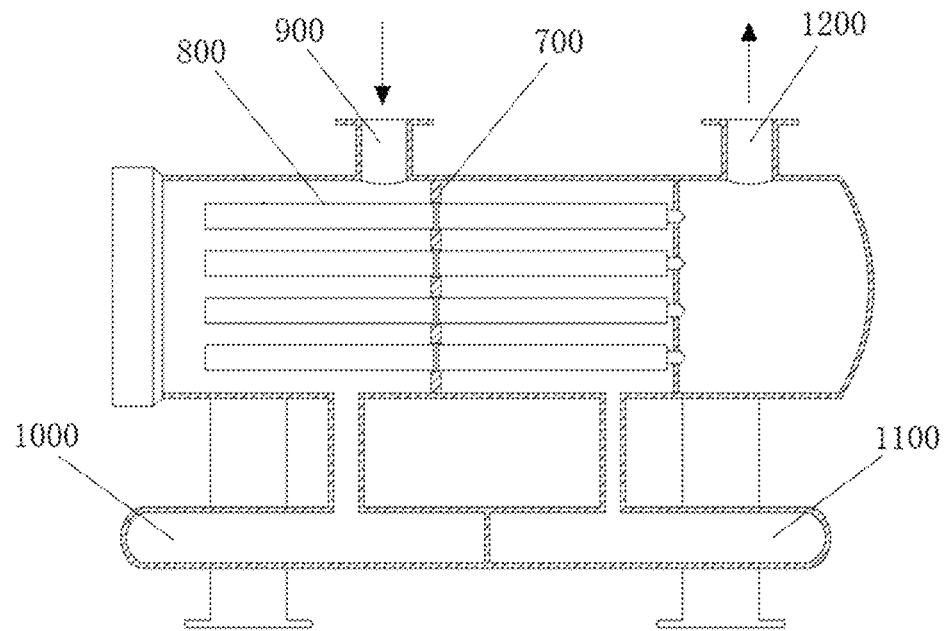
FIG. 4 --Prior Art--
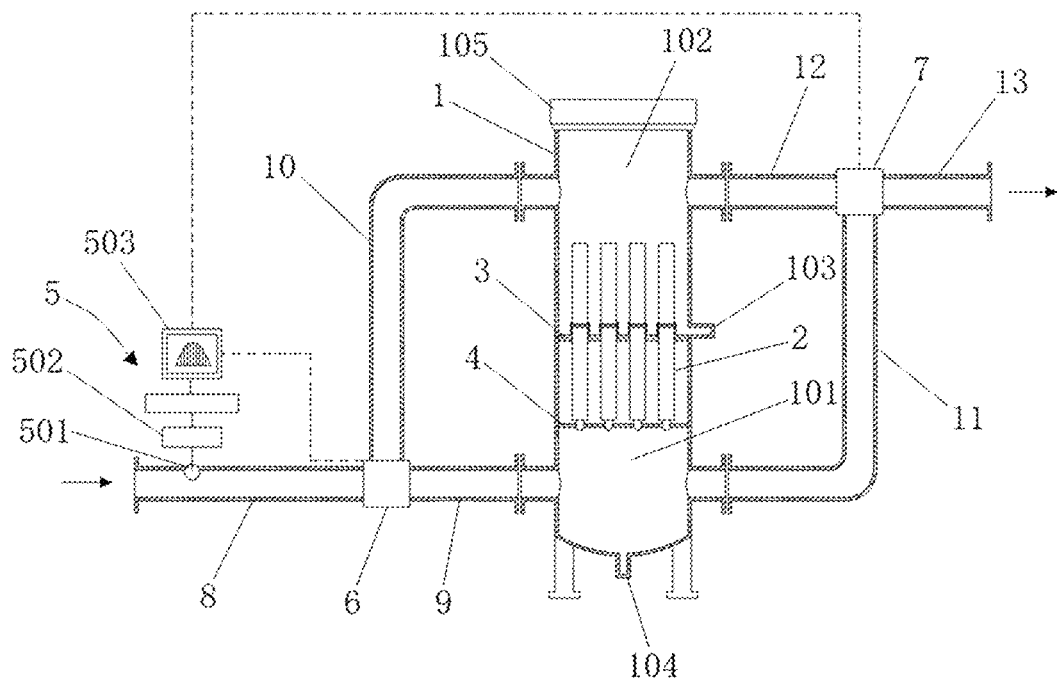
FIG. 5

SWITCHABLE TWO-STAGE COALESCENCE SEPARATION SYSTEM

RELATED APPLICATION

This application is a continuation of International Application No. PCT/CN2021/137428, filed on Dec. 13, 2021, which claims priority to Chinese Patent Application No. 202110264220.5, filed on Mar. 11, 2021, entitled 'Switchable Two-stage Coalescence Separation System', both of which are hereby incorporated by reference in their entireties.

FIELD

The present disclosure relates to a technical field of natural gas transportation, and particularly to a switchable two-stage coalescence separation system.

BACKGROUND

Pipeline transportation in natural gas transportation technology is the optimum way to realize a long-distance transmission of a large amount of oil and gas resources. To realize long-distance transportation, it is necessary to provide compressor stations along the pipeline to pressurize natural gas. The core power equipment of the compressor station is a compressor. Natural gas extracted from the ground usually contains some minerals, clay, water, condensate, or other impurities. If solid particles or droplets enter the compressor, the blade or dry gas seal system of the compressor will be worn, corroded, or thermally strained, which may cause the compressor to shut down in severe cases.

Generally, the natural gas entering the compressor station passes through devices such as a cyclone separator, a filter separator, and a coalescer in sequence to remove the solid and liquid impurities entrained in the gas, so as to ensure continuous and normal operation of the compressor for an extended period. The filter separator is usually disposed at the upstream of the coalescer and configured to remove droplets and solid dust with a particle diameter of more than 1 μm. The coalescer is mainly configured to remove droplets with a particle diameter of less than 1 μm. The core component of the coalescer is coalescing filter elements. The gas with droplets enters the filter element through micropores thereof from an inner surface of the coalescing filter element. The droplets in the gas are captured by fibers of the filter element, and then collided, coalesced, and merged into larger droplets in the filter media. The coalesced droplets move to the outside of the filter element along with the gas flow, and finally drain from the outer surface of the filter element by gas drag force and gravity. The filtered gas flows through the outer surface of the filter element and then exits the downstream process through an outlet of the coalescer.

At present, most coalescers are mounted vertically, which allows the tiny droplets to drain from the outer surface of the filter element smoothly by gas drag force and gravity after being coalesced, and allows the filtered gas move upward in a direction opposite to that of the liquid, thus greatly reducing the droplet re-entrainment. Very few coalescers are mounted horizontally due to the fact that the liquid will fully wet the entire length area of the filter element of the horizontally mounted coalescer (i.e., an area below the horizontal center line of the filter element). Compared with the coalescers mounted vertically, the coalescers mounted horizontally have a higher content of liquid in the filter element and more pores in the filter media being filled by the liquid. Therefore, when the coalescers are mounted horizontally, on the one hand, the area of clean fibers in the filter media that can effectively capture droplets is reduced, which decreases the filtration efficiency; on the other hand, the liquid on the surface of the filter element and the liquid inside the filter element will generate strong molecular attraction, which will prevent the liquid on the surface of the filter element from separating from the filter element, thus leading to a serious liquid clogging in the filter element. In addition, when the horizontally mounted filter element drains liquid, the gas and the liquid move in the same direction, and the liquid is easily entrained by the gas into the downstream of the filter element, resulting in weakened filtration performance. Therefore, the horizontally mounted coalescers are suitable for situations where the content of solid and liquid in the gas is extremely low. However, these situations are rare in actual sites, especially in the long-distance transportation of natural gas. In addition, the vertically mounted coalescers are also suitable for these low pollution situations, so the vertically mounted coalescers have stronger applicability.

The structure of the vertically mounted coalescer in the prior art is illustrated in FIG. 1. The vertically mounted coalescer is internally provided with a tube sheet 100, which divides an interior of the coalescer into an upper portion and a lower portion. The lower portion is a liquid-containing gas chamber and the upper portion is a filtered gas chamber. The gas with droplets enters the liquid-containing gas chamber through an inlet 200 of the coalescer, then passes to the inner side of each coalescing filter element 300 through an opening at the bottom of the coalescing filter element 300 by gas driving force, and then flows into the coalescing filter element 300 through pores of the filter material in the inner surface of the coalescing filter element 300. After being coalesced, where tiny droplets in the gas collide, coalesce, and merge into larger droplets inside the filter material of the coalescing filter element 300, the coalesced liquid drains through the outer surface of the coalescing filter element 300. The drained liquid falls on the tube sheet 100 by gravity, and then drains from the coalescer through a first liquid vent 400 at the lower portion of the filtered gas chamber. The filtered gas flows through the outer surface of the coalescing filter element 300, and then exits to the downstream process through an outlet 500 at the upper portion of the filtered gas chamber. If the liquid content in the gas is extremely high, part of the liquid will be directly captured on the inner surface of the coalescing filter element 300, then fall to the bottom of the liquid-containing gas chamber by gravity, and then drained from the coalescer through a second liquid vent 600 at the bottom of the liquid-containing gas chamber.

The structure of the coalescing filter element 300 in the prior art is illustrated in FIGS. 2 and 3. An inner support 3001 serves as a support for the coalescing filter element 300. A coalescing layer 3002, which is composed of multi-layer fibrous filter media for coalescing droplets and usually made up of glass fibers, is wrapped outside the inner support 3001. An outer support 3003 is provided outside the coalescing layer 3002 to fix it. A drainage layer 3004 is wrapped outside the outer support 3003. The drainage layer 3004, which is composed of a single-layer fibrous filter medium for draining coalesced liquid, is capable of capturing large droplets caused by droplet re-entrainment from the coalescing layer 3002. The drainage layer 3004 is usually made up of polymer fibers such as aramid fibers and is assembled outside the filter element.

A bottom end cap 3005 and a top end cap 3006 of the filter element are connected with the drainage layer 3004 to seal both ends of the inner support 3001, the coalescing layer 3002, the outer support 3003, and the drainage layer 3004, so that the gas with liquid and solid contaminants can only pass through the coalescing filter element 300 in the radial direction, where the coalescence and filtration are completed efficiently during this process.

The structure of the horizontally mounted coalescer in the prior art is illustrated in FIG. 4. The interior of the horizontally mounted coalescer is provided with a filter element holding tube sheet 700, which divides an interior of the horizontally mounted coalescer into a liquid-containing gas side and a filtered gas side, and fixes a two-stage coalescing filter element 800 horizontally. A portion of the two-stage coalescing filter element 800 inside the liquid-containing gas side is a first-stage filter element portion, and another portion of the two-stage coalescing filter element 800 inside the filtered gas side is a second-stage filter element portion. The gas with droplets enters the liquid-containing gas side of the coalescer through an inlet 900 of the coalescer, reaches each of the two-stage coalescing filter elements 800 by gas driving force, and flows into the two-stage coalescing filter element 800 through pores of the filter material in the outer surface of the first-stage filter element portion, during which the droplets with a large diameter are filtered and separated by the filter element. The separated liquid falls into a first-stage liquid collection tank 1000 below the liquid-containing gas side by gravity. The separated gas moves inside the filter element toward the filtered gas side, and enters the filter material through the pores thereof in the inner surface of the second-stage filter element portion. The droplets in the separated gas coalesce and merge into liquid in the filter material of the second-stage filter element portion, and then the coalesced liquid drains through the outer surface of the second-stage filter element portion. The drained liquid falls into a second-stage liquid collection tank 100 below the filtered gas side by gravity. The filtered gas is discharged through an outlet 1200 of the coalescer.

However, the coalescing filter element, serves as the core component of the coalescer, usually has the following disadvantages during the operation.

1. The coalescer is mainly designed to remove droplets with particle diameters less than 1 μm without considering the removal of solid particles. However, the content of dust and liquid in the gas fluctuates greatly under actual site conditions. When the gas contains submicron solid particles with a high concentration, the coalescing filter element may be easily clogged, leading to a sudden increase in the pressure drop of the coalescing filter element, a significant increase in the energy consumption of the system, and a frequent replacement of the filter element, which will result in a high usage cost and prevent the continuous operation of the coalescer.

2. The coalescer is usually mounted vertically in the prior art, and the filter element of the coalescer is of a single stage (i.e., only filtering the gas once). When the concentration of droplets in the gas exceeds the maximum treatment capacity of the coalescing filter element, the filter element will be saturated in a short time, and its service life is shortened.

3. For the coalescing filter element of the horizontally mounted two-stage coalescer, the area of the filter element below the horizontal center line of the filter element will be fully wetted by the liquid after a long-term operation, and the coalesced liquid cannot be drained from the filter element in time, which will weaken the capture of droplets by fibers of the filter element and lead to droplet re-entrainment, resulting in a decrease in filtration efficiency.

4. The filter elements in various coalescers are all disposable. Once the pressure drop of the filter element is too large, the whole filter element should be replaced rather than being reused, resulting in a significant increase in the use cost.

The above situations particularly exist in a compressor station of a long-distance transportation pipeline. When the content of submicron droplets or dust in the gas suddenly increases, the above problems become more obvious.

However, there is still no effective solution in the prior art to solve the problem that the coalescing filter element is easily clogged and the working performance of the coalescer does not meet the requirements.

SUMMARY

An objective of the present disclosure is to provide a switchable two-stage coalescence separation system, which can detect and analyze impurities in gas entering a pipeline, and control each multi-way valve on a rear pipeline according to detection results, so that the inlet pipeline and the outlet pipeline of the coalescer can be switched according to contents of dust and liquid in the gas, and the solid and liquid can be pertinently separated from the gas by the two-stage filter element, thereby effectively prolonging the service life of the filter element and reducing energy consumption.

The objective of the present disclosure can be achieved by the following technical solutions.

The present disclosure provides a switchable two-stage coalescence separation system, including a coalescer housing, a number of two-stage filter elements, and a particle detector for detecting a content of solid particles and a content of droplets in gas entering the coalescer housing, wherein the coalescer housing is provided with a tube sheet inside, and the tube sheet divides an interior of the coalescer housing into a lower chamber and an upper chamber; each of the two-stage filter elements is disposed on the tube sheet, and a lower part and an upper part of each of the two-stage filter elements are located in the lower chamber and the upper chamber, respectively;

the coalescer housing is connected with a first gas inlet branch pipe communicated with the lower chamber and a second gas inlet branch pipe communicated with the upper chamber; the first gas inlet branch pipe and the second gas inlet branch pipe are connected to a gas inlet main pipe through a first multi-way valve, and the particle detector is disposed on the gas inlet main pipe;

the coalescer housing is connected with a first gas outlet branch pipe communicated with the upper chamber and a second gas outlet branch pipe communicated with the lower chamber; the first gas outlet branch pipe and the second gas outlet branch pipe are connected to a gas outlet main pipe through a second multi-way valve.

The present disclosure has the following advantages.

1. In the switchable two-stage coalescence separation system, the particle detector is combined with the coalescence system. Therefore, the contents of solid particles and droplets, and particle diameter distributions of various impurities in the gas can be determined by the particle detector for switching the flowing direction of the gas entering the coalescer housing, so as to filter the gas by the two-stage filter element. The filtering mode can be adjusted in time according to the changes of impurities in the gas under actual working conditions, which greatly improves the intelligence of the coalescence filtration, and expands the application range of the coalescence system.

2. During the use of the switchable two-stage coalescence separation system, when the gas contains submicron solid particles with a high-concentration, the gas is switched to enter the upper chamber, and the dustproof membrane on the outer surface of the upper filter element can effectively prevent solid particles such as dust from entering the filter element, so as to avoid clogging of the filter media and reduce deposition of dust on the outer surface of the upper filter element. After the gas is switched to enter the lower chamber, the coalesced liquid is drained from the upper filter element from inside to outside, during which the dust deposited on the outer surface of the upper filter element is automatically back-flushed by the coalesced liquid. Therefore, the dust is entrained by the liquid and separated from the filter element, which can slow down the increase in the pressure drop of the filter element, reduce energy consumption of the system, prolong the continuous operation time of the filter element and the coalescence system, decrease the replacement frequency of the filter element, and reduce the operation and maintenance cost and the filter element procurement cost.

3. During the use of the switchable two-stage coalescence separation system, when the gas contains droplets with a concentration larger than the treatment capacity of the two-stage filter element, the gas is switched to enter the lower chamber, and the droplets in the gas are captured on the outer surface of the lower filter element and prevented from migrating into the lower filter element by the super-amphiphilic nanofiber membrane on the outer surface of the lower filter element and the super-amphiphobic filter media of the lower coalescing layer, which greatly reduces the amount of liquid required to be separated by the upper filter element, improves the filtration efficiency of the upper filter element while significantly reducing liquid clogging of the filter element, thereby ensuring the clean fiber area for effectively capturing droplets for a long time, and prolonging the operation time of the two-stage filter element in high-efficiency filtration at least by 2 to 3 times. In addition, compared with the single-stage filter element in the prior art, the two-stage filter element has a greater capacity for processing gas with high liquid content, a wider application range, and a better gas filtration performance.

4. In the switchable two-stage coalescence separation system, the first connecting piece, the second connecting piece, and the third connecting piece are fixed by threaded connection, which facilitates the detachment and separate replacement of the upper filter element and the lower filter element during use. Generally, the continuous increase in pressure drop of the filter element is mainly caused by the clogging of the filter element by tiny dust particles. During the use of the present disclosure, when the predetermined pressure drop for replacement of the filter element is reached, it is possible to disassemble and replace only the upper filter element or the lower filter element according to the actual situation, instead of replacing the whole filter element, thus reducing the purchasing cost of the filter element by at least 40%.

BRIEF DESCRIPTION OF THE DRAWINGS

The following drawings are only intended to schematically illustrate and explain the present disclosure, rather than limiting the scope thereof. In the drawings:

FIG. 1 is a schematic structural diagram of a coalescer mounted vertically in the prior art.

FIG. 2 is a schematic structural diagram of a coalescing filter element in the prior art.

FIG. 3 is a cross-sectional view along lines B-B of FIG. 2.

FIG. 4 is a schematic structural diagram of a coalescer mounted horizontally in the prior art.

FIG. 5 is a schematic structural diagram of a switchable two-stage coalescence separation system of the present disclosure.

DETAILED DESCRIPTION

Figure 6:
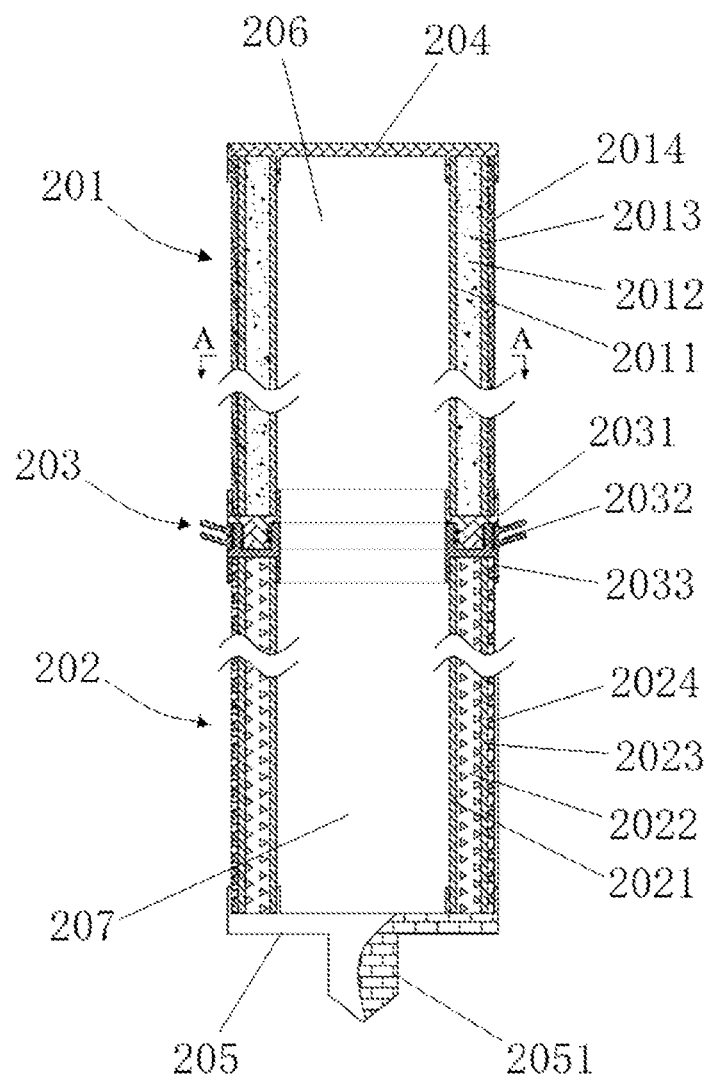
FIG. 6 is a schematic structural diagram of a two-stage filter element in a switchable two-stage coalescence separation system of the present disclosure.

For a clearer understanding of the technical features, objectives and effects of the present disclosure, specific embodiments of the present disclosure will now be described with reference to the drawings.

As illustrated in FIG. 5, the present disclosure provides a switchable two-stage coalescence separation system, which includes a coalescer housing 1, a plurality of two-stage filter elements 2, and a particle detector 5. Each of the two-stage filter elements 2 is configured to filter solid particles and droplets in gas (e.g., natural gas) entering the coalescer housing 1. A lower part and an upper part of each of the two-stage filter elements are located in the lower chamber and the upper chamber, respectively. The particle detector 5 is configured to detect a content of the solid particles and a content of the droplets in the gas entering the coalescer housing 1. The coalescer housing 1 is provided with a tube sheet 3 at a middle position inside. The tube sheet 3 is a flat sheet disposed in a horizontal direction and divides an interior of the coalescer housing 1 into a lower chamber 101 and an upper chamber 102 located above the lower chamber 101. Each of the two-stage filter elements 2 is removably disposed on the tube sheet 3. Each of the two-stage filter elements 2 has a lower portion located in the lower chamber 101 and an upper portion located in the upper chamber 102. A first gas inlet branch pipe 9 and a second gas inlet branch pipe 10 are connected to the coalescer housing 1, with one end of the first gas inlet branch pipe 9 being communicated with the lower chamber 101 and one end of the second gas inlet branch pipe 10 being communicated with the upper chamber 102. The other end of the first gas inlet branch pipe 9 and the other end of the second gas inlet branch pipe 10 are connected to a gas inlet main pipe 8 through a first multi-way valve 6. The particle detector 5 is disposed on the gas inlet main pipe 8. A first gas outlet branch pipe 12 and a second gas outlet branch pipe 11 are connected to the coalescer housing 1, with one end of the first gas outlet branch pipe 12 being communicated with the upper chamber 102 and one end of the second gas outlet branch pipe 11 being communicated with the lower chamber 101. The other end of the first gas outlet branch pipe 12 and the other end of the second gas outlet branch pipe 11 are connected to a gas outlet main pipe 13 through a second multi-way valve 7.

The switchable two-stage coalescence separation system of the present disclosure is used as follows.

Figure 17:
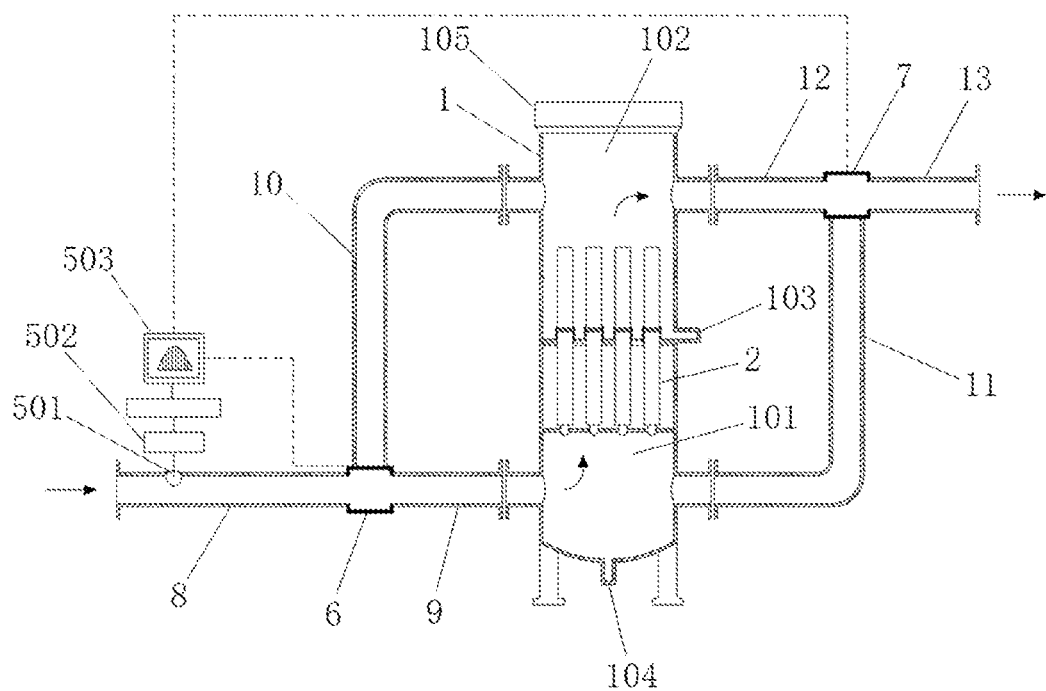
FIG. 17 is a first working state diagram of a switchable two-stage coalescence separation system of the present disclosure.

As illustrated in FIG. 17, when the impurities in the gas are mainly droplets, the first multi-way valve 6 and the second multi-way valve 7 are adjusted so that the gas inlet main pipe 8 is communicated with the first gas inlet branch pipe 9, the gas outlet main pipe 13 is communicated with the first gas outlet branch pipe 12, and the second gas inlet branch pipe 10 and the second gas outlet branch pipe 11 are blocked. The gas with impurities enters the lower chamber 101 through the first gas inlet branch pipe 9, and reaches each of the two-stage filter elements 2 by gas driving force, where the droplets with large particle diameters are captured on an outer surface of a lower filter element 202 and form liquid separated from the gas. The separated liquid falls into the lower chamber 101 by gravity and then drains through a lower chamber sewage draining port 104. The droplets with small particle diameters pass through the filter element 202 from the outside inwards, enter the inner side of the filter element 202, move toward an upper filter element 201, then pass through fiber pores of the upper filter element 201 and coalesce in filter media of the upper filter element 201 to form coalesced liquid. The coalesced liquid drains from an outer surface of the upper filter element 201, falls on the tube sheet 3 by gravity, and then drains through an upper chamber sewage draining port 103. The filtered gas flows through the first gas outlet branch pipe 12 and the gas outlet main pipe 13 in turn and then exits to the downstream process.

Figure 18:
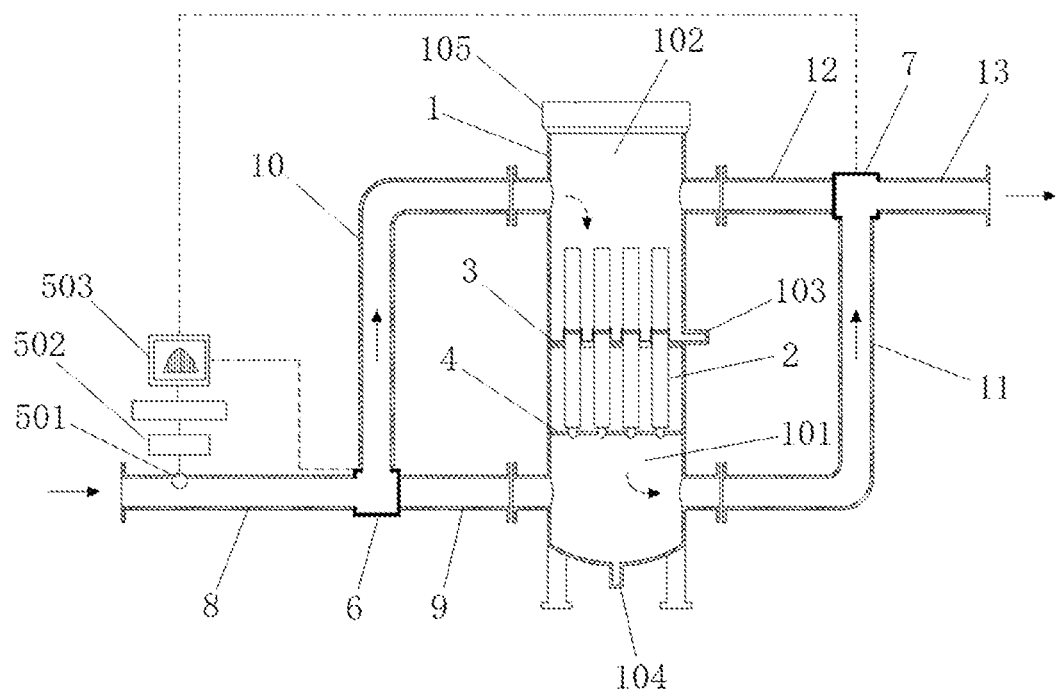
FIG. 18 is a second working state diagram of a switchable two-stage coalescence separation system of the present disclosure.

As illustrated in FIG. 18, when the impurities in the gas are mainly solid particles, the first multi-way valve 6 and the second multi-way valve 7 are adjusted so that the gas inlet main pipe 8 is communicated with the second gas inlet branch pipe 10, the gas outlet main pipe 13 is communicated with the second gas outlet branch pipe 11, and the first gas inlet branch pipe 9 and the first gas outlet branch pipe 12 are blocked. The gas with impurities enters the upper chamber 102 through the second gas inlet branch pipe 10, and reaches each of the two-stage filter elements 2 by gas driving force, where the solid particles are captured on the outer surface of the upper filter element 201, and the gas passes through the upper filter element 201 from the outside inwards and enters the inner side of the upper filter element 201, moves toward the lower filter element 202, and passes through fiber pores of the lower filter element 202 and coalesce in filter media of the lower filter element 202 to form coalesced liquid. The coalesced liquid drains from an outer surface of the lower filter element 202, falls into the lower chamber 101, and drains through the lower chamber sewage draining port 104. The filtered gas flows through the second gas outlet branch pipe 11 and the gas outlet main pipe 13 in turn and then exits to the downstream process.

In the use procedure of the system of the present disclosure, firstly, the impurities (i.e., the content of solid particles and the content of droplets) in the gas entering the gas inlet manifold 8 are detected by the particle detector 5, and then the first multi-way valve 6 and the second multi-way valve 7 are controlled according to the detection results, so as to control the filtering direction of the gas in the coalescer housing (i.e., the gas enters the coalescer housing 1 through the lower chamber 101 or the upper chamber 102), and change the filtering sequence of the gas, thereby pertinently separating the solid impurities and the liquid impurities, which not only improves the filtration performance of the coalescer, but also reduces the clogging of the filter element, effectively prolongs the service life of the filter element, reduces the cost, and reduces energy consumption.

Further, as illustrated in FIG. 5, the particle detector 5 may be a traditional online detection device for detecting particles and droplets. The particle detector 5 includes a sampling device 501, an online particle detection device 502, and a data processor 503. The sampling device 501 is configured to sample gas in a pipeline. The online particle detection device 502 is configured to detect the sampled gas to identify solid particles and droplets in the gas, so as to obtain contents of solid particles and droplets. The data processor 503 is configured to collect and feedback data results for controlling the first multi-way valve 6 and the second multi-way valve 7.

Specifically, as illustrated in FIG. 5, both the first multi-way valve 6 and the second multi-way valve 7 are three-way valves. An inlet of the first multi-way valve 6 is connected to the gas inlet main pipe 8, a first outlet of the first multi-way valve 6 is connected to the first gas inlet branch pipe 9, and a second outlet of the first multi-way valve 6 is connected to the second gas inlet branch pipe 10. A first inlet of the second multi-way valve 7 is connected to the first gas outlet branch pipe 12, a second inlet of the second multi-way valve 7 is connected to the second gas outlet branch pipe 11, and an outlet of the second multi-way valve 7 is connected to the gas outlet main pipe 13.

In an optional embodiment of the present disclosure, as illustrated in FIG. 5, the coalescer housing 1 is provided with a lower chamber sewage draining port 104 communicated with the lower chamber 101 and located at a bottom portion of the lower chamber 101. The coalescer housing 1 is further provided with an upper chamber sewage draining port 103 communicated with the upper chamber 102 and located at a bottom portion of the upper chamber 102. Therefore, solid and liquid impurities that remain in the lower chamber 101 and the upper chamber 102 after filtration can be drained through the lower chamber sewage draining port 104 and the upper chamber sewage draining port 103.

Further, as illustrated in FIG. 5, a top portion of the coalescer housing 1 is provided with an opening, and a cover plate 105 is disposed at the opening to block it. The cover plate 105 can be removed to facilitate the replacement of the two-stage filter element 2, so as to ensure that the two-stage filter element 2 is always in high-efficiency filtration state.

In an optional embodiment of the present disclosure, as illustrated in FIG. 6, the two-stage filter element 2 includes an upper filter element 201 and a lower filter element 202, both of which are cylindrical structures disposed in a vertical direction and opened at two ends. A top portion of the upper filter element 201 is fixedly provided with a top cap 204 which blocks an opening on a top portion of the upper filter element 201, so that an inner side of the upper filter element 201 and the top cap 204 enclose to form an upper filter chamber 206. A bottom portion of the lower filter element 202 is fixedly provided with a bottom cap 205 which blocks an opening at a bottom portion of the lower filter element 202, so that an inner side of the lower filter element 202 and the bottom cap 205 enclose to from a lower filter chamber 207. A bottom portion of the upper filter element 201 is connected to a top portion of the lower filter element 202 through a connecting assembly 203, so that the upper filter chamber 206 and the lower filter chamber 207 are communicated in the vertical direction. The connecting assembly 203 is fixedly disposed on the tube sheet 3 and cooperates with the tube sheet 3 to fix the two-stage filter element 2 in the vertical direction inside the coalescer housing 1.

Figure 16:
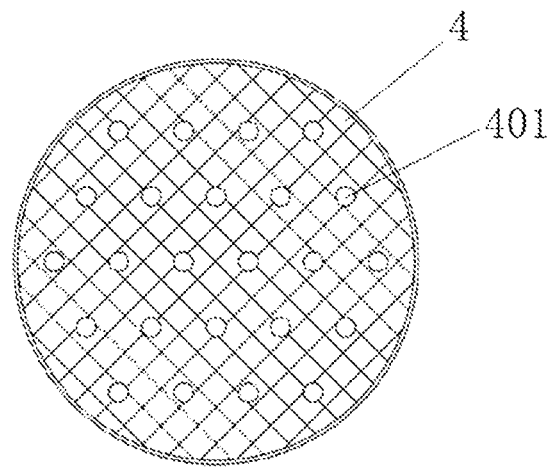
FIG. 16 is a top view of a filter element positioning plate in a switchable two-stage coalescence separation system of the present disclosure.

In an optional embodiment of the present disclosure, as illustrated in FIGS. 5 and 16, the switchable two-stage coalescence separation system further includes a filter element positioning plate 4, which is a flat sheet disposed in a horizontal direction. The filter element positioning plate 4 is provided with a plurality of vent holes through which gas can pass and a plurality of first fixing holes 401 for positioning the two-stage filter elements 2. A middle position of a bottom portion of the bottom cap 205 of each of the two-stage filter elements 2 is provided with a positioning column 2051 in a vertical direction. The positioning column 2051 is fixedly inserted into a corresponding first fixing hole 401 to position each of the two-stage filter elements 2 inside the coalescer housing 1, thereby improving the stability of each two-stage filter element 2.

Figure 7:
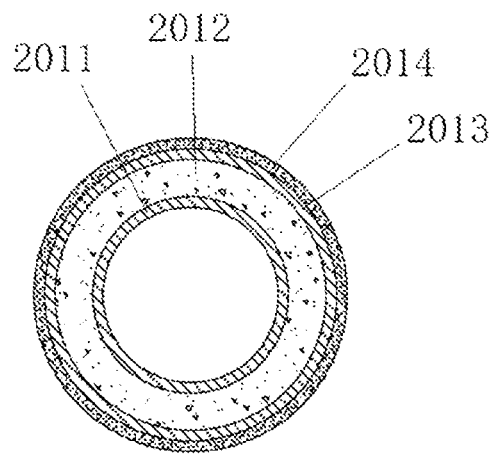
FIG. 7 is a cross-sectional view along lines A-A of FIG. 6.
Figure 8:
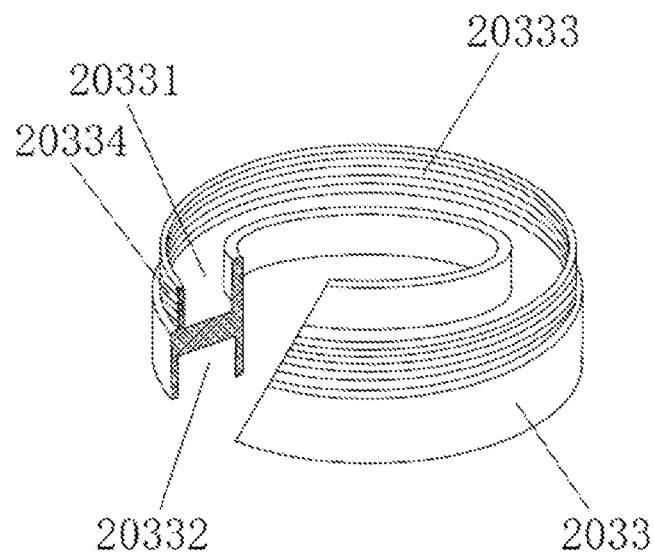
FIG. 8 is a schematic structural diagram of a first connecting piece in a switchable two-stage coalescence separation system of the present disclosure.
Figure 9:
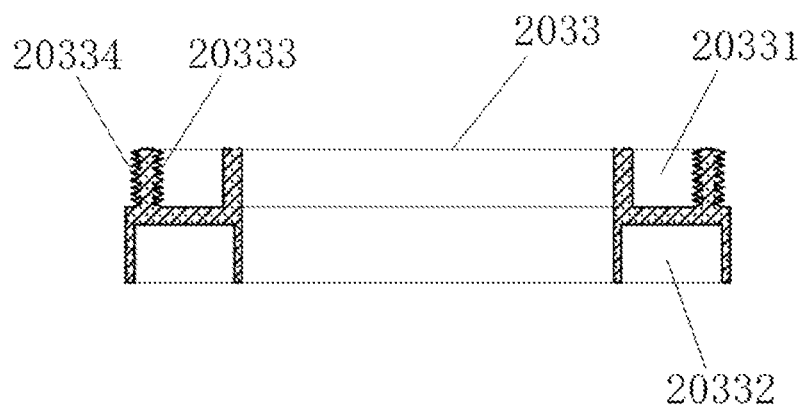
FIG. 9 is a front cross-sectional view of a first connecting piece in a switchable two-stage coalescence separation system of the present disclosure.
Figure 10:
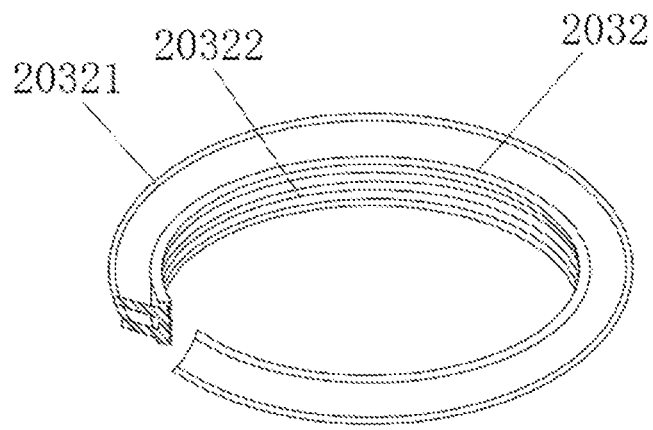
FIG. 10 is a schematic structural diagram of a second connecting piece in a switchable two-stage coalescence separation system of the present disclosure.
Figure 11:
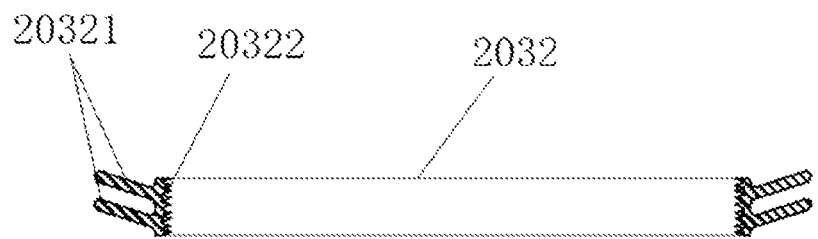
FIG. 11 is a front cross-sectional view of a second connecting piece in a switchable two-stage coalescence separation system of the present disclosure.
Figure 12:
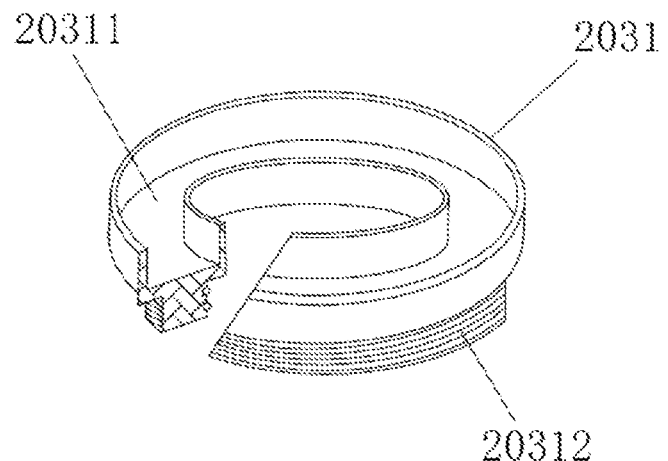
FIG. 12 is a schematic structural diagram of a third connecting piece in a switchable two-stage coalescence separation system of the present disclosure.
Figure 13:
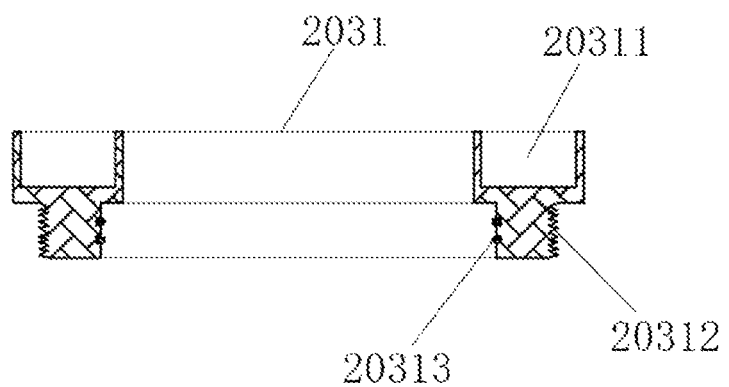
FIG. 13 is a front cross-sectional view of a third connecting piece in a switchable two-stage coalescence separation system of the present disclosure.

In an optional embodiment of the present disclosure, as illustrated in FIGS. 6 and 7, the upper filter element 201 includes a first upper support framework 2011 and a second upper support framework 2013, both of which are cylindrical structures disposed in a vertical direction and opened at two ends. The first upper support framework 2011 and the second upper support framework 2013 are respectively provided with a plurality of ventilation holes uniformly distributed, through which the gas can smoothly pass during filtration. The first upper support framework 2011 fixedly sleeves on the outside of the second upper support framework 2013. An upper coalescing layer 2012 is interposed between an outer surface of the first upper support framework 2011 and an inner surface of the second upper support framework 2013. An outer surface of the second upper support framework 2013 is covered with an upper liquid drainage layer 2014. When the gas with impurities enters the upper chamber 102 first, the upper filter element 201 mainly captures the solid particles in the gas, so that the solid particles are captured on an outer surface of the upper liquid drainage layer 2014. When the gas with impurities enters the lower chamber 101 first, the upper filter element 201 mainly filters the submicron droplets in the gas, so that the droplets are coalesced and filtered in the upper coalescing layer 2012 and drained into the upper chamber 102 through the upper liquid drainage layer 2014.

Further, the upper liquid drainage layer 2014 is composed of amphiphobic filter media, and a dustproof membrane covers an outer side surface of the upper liquid drainage layer 2014, so that the dustproof membrane can effectively reduce the deposition of solid particles on the outer surface of the upper liquid drainage layer 2014 and prevent the solid particles from entering the interior of the two-stage filter element 2, thereby avoiding the clogging of the filter media. In addition, after the filtering direction is switched, the liquid coalesced on the upper filter element 201 will be drained from the filter element from inside to outside, during which the solid particles deposited on the outer surface of the upper liquid discharge layer 2014 are back-flushed by the liquid and fall into the upper chamber 102 along with the liquid, so that the solid particles are separated from the two-stage filter element 2.

Further, the dustproof membrane may be a polytetrafluoroethylene microporous membrane with strong amphiphobic performance and low surface tension, which can effectively reduce the deposition of solid particles and prevent the solid particles from clogging the filter media.

Preferably, the upper coalescing layer 2012 has a pore diameter of 1 μm to 3 μm, and the upper liquid drainage layer 2014 has a pore diameter of 20 μm to 40 μm.

In an optional embodiment of the present disclosure, as illustrated in FIG. 6, the lower filter element 202 includes a first lower support framework 2021 and a second lower support framework 2023, both of which are cylindrical structures disposed in a vertical direction and opened at two ends. The first lower support framework 2021 and the second lower support framework 2023 are respectively provided with a plurality of ventilation holes uniformly distributed, through which the gas can smoothly pass during filtration. The first lower support framework 2021 fixedly sleeves on the outside of the second lower support framework 2023. A lower coalescing layer 2022 is interposed between an outer surface of the first lower support framework 2021 and an inner surface of the second lower support framework 2023. An outer surface of the second lower support framework 2023 is covered with a lower liquid drainage layer 2024. When the gas with impurities enters the upper chamber 102 first, the lower filter element 202 mainly captures the droplets entrained by the gas as it passes through the upper filter element 201. When the gas with impurities enters the lower chamber 101 first, the lower filter element 202 mainly pre-filters droplets with particle diameters larger than 1 μm or droplets with a high-concentration in the gas.

Further, the outer surface of the lower liquid drainage layer 2024 is covered by a super-amphiphilic nanofiber membrane, which can effectively capture droplets. To cooperation with the super-amphiphilic nanofiber membrane, the lower coalescing layer 2022 is composed of a super-amphiphobic filter media to prevent the droplets captured by the lower liquid drainage layer 2024 from migrating into the filter element. In addition, the pore diameter of the lower coalescing layer 2022 gradually increases from outside to inside, with a variation range from 3 μm to 10 μm, so that tiny droplets can smoothly pass through and the accumulation of liquid in the two-stage filter element 2 can be reduced.

In an optional embodiment of the present disclosure, as illustrated in FIGS. 6 and 8 to 13, the connecting assembly 203 includes a first connecting piece 2033, a second connecting piece 2032 and a third connecting piece 2031, all of which are annular structures disposed in a horizontal direction. A top portion of the first connecting piece 2033 is provided with an annular first positioning groove 20331. A bottom portion of the first connecting piece 2033 is provided with an annular second positioning groove 20332 into which a top portion of the lower filter element 202 is hermetically embedded. An inner side surface of the first positioning groove 20331 away from an axis thereof is provided with a first internal thread 20333, an outer surface of an upper portion of the first connecting piece 2033 is provided with a first external thread 20334, and an inner surface of the second connecting piece 2032 is provided with a second internal thread 20322. The second connecting piece 2032 sleeves on the outside of the first connecting piece 2033, and the second connecting piece 2032 and the first connecting piece 2033 are connected through the screw-coupling of the first external thread 20334 and the second internal thread 20322. A top portion of the third connecting piece 2031 is provided with an annular third positioning groove 20311, into which a bottom portion of the upper filter element 201 is hermetically embedded. An outer surface of a lower portion of the third connecting piece 2031 is provided with a second external thread 20312, the lower portion of the third connecting piece 2031 is screwed into the first positioning groove 20331, and the third connecting piece 2031 and the first connecting piece 2033 are connected through the screw-coupling of the first internal thread 20333 and the second external thread 20312. An inner surface of the lower portion of the third connecting piece 2031 is provided with at least one sealing ring 20313 in a circumferential direction of the third connecting piece 2031. The sealing ring 20313 is interposed between the inner surface of the lower portion of the third connecting piece 2031 and an inner side surface of the first positioning groove 20331 close to the axis. Therefore, the upper filter element 201 and the lower filter element 202 are connected by the cooperation of the first connecting piece 2033, the second connecting piece 2032 and the third connecting piece 2031, so as to ensure an excellent seal between the upper filter element 201 and the lower filter element 202, prevent the lower chamber 101 from being communicated with the upper chamber 102, and ensure filtration performance of the two-stage filter element 2 on the gas. In addition, the first connecting piece 2033, the second connecting piece 2032 and the third connecting piece 2031 are fixed by threaded connection, which facilitates the detachment and separate replacement of the upper filter element 201 and the lower filter element 202 during use.

Figure 14:
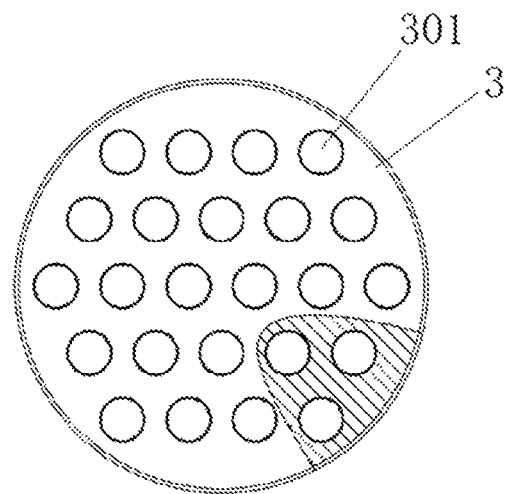
FIG. 14 is a top view of a tube sheet in a switchable two-stage coalescence separation system of the present disclosure.
Figure 15:
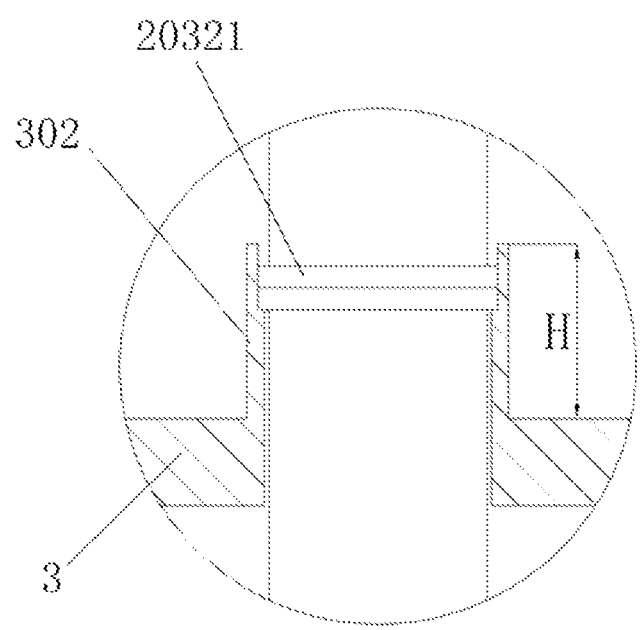
FIG. 15 is an enlarged fragmentary view of a connection position between a tube sheet and a two-stage filter element in a switchable two-stage coalescence separation system of the present disclosure.

In an optional embodiment of the present disclosure, as illustrated in FIGS. 5, 14 and 15, the tube sheet 3 is provided with a plurality of second fixing holes 301, and a support seat 302 is disposed above each of the second fixing holes 301. The support seat 302 is of cylindrical structure disposed in a vertical direction and opened at two ends. A bottom portion of the support seat 302 is connected to an edge of the second fixing hole 301. An outer surface of the second connecting piece 2032 is provided with at least one sealing ring 20321 in a circumferential direction of the second connecting piece 2032. The two-stage filter element 2 is inserted into the corresponding second fixing hole 301, and the sealing ring 20321 is tightly attached to an inner surface of the support seat 302. The support seat 302 can prevent the liquid accumulated in the upper chamber 102 from directly contacting the two-stage filter element 2, thus preventing the filter element from being wetted, effectively avoiding the flowing gas from breaking through the liquid and entraining droplets, thereby ensuring filtration efficiency.

Preferably, the height H of the support base 302 is preferably 30 mm to 60 mm. If the height of the support base 302 is too low, the liquid storage capacity of the upper chamber 102 will be low, resulting in frequent liquid discharge from the upper chamber 102. If the height of the support base 302 is too high, the effective filtering area of the two-stage filter element 2 will be reduced, resulting in a decrease of the filtration efficiency.

Further, the tube sheet 3 and the support base 302 are connected by integrated molding.

Those described above are only schematic embodiments of the present disclosure, and are not intended to limit the scope of the present disclosure. Any equivalent change and modification made by those skilled in the art without departing from the concept and principle of the present disclosure should fall within the protection scope of the present disclosure.

What is claimed is:

1. A switchable two-stage coalescence separation system, comprising a coalescer housing, a plurality of two-stage filter elements, and a particle detector for detecting a content of solid particles and a content of droplets in gas entering the coalescer housing, wherein
the coalescer housing is provided with a tube sheet inside, and the tube sheet divides an interior of the coalescer housing into a lower chamber and an upper chamber; each of the two-stage filter elements is disposed on the tube sheet, and a lower part and an upper part of each of the two-stage filter elements are located in the lower chamber and the upper chamber, respectively;
the coalescer housing is connected with a first gas inlet branch pipe communicated with the lower chamber and a second gas inlet branch pipe communicated with the upper chamber; the first gas inlet branch pipe and the second gas inlet branch pipe are connected to a gas inlet main pipe through a first multi-way valve, and the particle detector is disposed on the gas inlet main pipe;
the coalescer housing is connected with a first gas outlet branch pipe communicated with the upper chamber and a second gas outlet branch pipe communicated with the lower chamber; the first gas outlet branch pipe and the second gas outlet branch pipe are connected to a gas outlet main pipe through a second multi-way valve.

2. The switchable two-stage coalescence separation system according to claim 1, wherein the coalescer housing is provided with a lower chamber sewage draining port communicated with the lower chamber and an upper chamber sewage draining port communicated with the upper chamber;
the lower chamber sewage draining port is located at a bottom portion of the lower chamber, and the upper chamber sewage draining port is located at a bottom portion of the upper chamber;
a top portion of the coalescer housing is provided with an opening, and a cover plate is provided at the opening.

3. The switchable two-stage coalescence separation system according to claim 1, wherein the two-stage filter element comprises an upper filter element and a lower filter element, both of which are cylindrical structures disposed in a vertical direction and opened at two ends;
a top portion of the upper filter element is provided with a top cap, and an inner side of the upper filter element and the top cap enclose to form an upper filter chamber;
a bottom portion of the lower filter element is provided with a bottom cap, and an inner side of the lower filter element and the bottom cap enclose to form a lower filter chamber;
a bottom portion of the upper filter element is connected to a top portion of the lower filter element through a connecting assembly, so that the upper filter chamber and the lower filter chamber are communicated in the vertical direction.

4. The switchable two-stage coalescence separation system according to claim 3, further comprising a filter element positioning plate, which is provided with vent holes through which gas can pass and first fixing holes for positioning the two-stage filter element;
   a bottom portion of the bottom cap is provided with a positioning column which is fixedly inserted into a corresponding first fixing hole.

5. The switchable two-stage coalescence separation system according to claim 3, wherein the upper filter element comprises a first upper support framework and a second upper support framework sleeved by the first upper support framework;
   an upper coalescing layer is interposed between an outer surface of the first upper support framework and an inner surface of the second upper support framework, and an outer surface of the second upper support framework is covered with an upper liquid drainage layer.

6. The switchable two-stage coalescence separation system according to claim 5, wherein the upper liquid drainage layer comprises amphiphobic filter media, and a dustproof membrane covers an outer side surface of the upper liquid drainage layer;
   the upper coalescing layer has a pore diameter of 1 µm to 3 µm, and the upper liquid drainage layer has a pore diameter of 20 µm to 40 µm.

7. The switchable two-stage coalescence separation system according to claim 5, wherein the lower filter element comprises a first lower support framework and a second lower support framework sleeved by the first lower support framework;
   a lower coalescing layer is interposed between an outer surface of the first lower support framework and an inner surface of the second lower support framework, and an outer surface of the second lower support framework is covered with a lower liquid drainage layer.

8. The switchable two-stage coalescence separation system according to claim 7, wherein an outer surface of the lower liquid drainage layer is covered by a super-amphiphilic nanofiber membrane, and the lower coalescing layer comprises super-amphiphobic filter media;
   a pore diameter of the lower coalescing layer increases from outside to inside, with a variation range from 3 µm to 10 µm.

9. The switchable two-stage coalescence separation system according to claim 7, wherein the connecting assembly comprises a first connecting piece, a second connecting piece and a third connecting piece, all of which are annular structures disposed in a horizontal direction;
   a top portion of the first connecting piece is provided with an annular first positioning groove, a bottom portion of the first connecting piece is provided with an annular second positioning groove into which the top portion of the lower filter element is hermetically embedded;
   an inner side surface of the first positioning groove away from an axis thereof is provided with a first internal thread, an outer surface of an upper portion of the first connecting piece is provided with a first external thread, and an inner surface of the second connecting piece is provided with a second internal thread;
   the second connecting piece sleeves on an outside of the first connecting piece, and the second connecting piece and the first connecting piece are connected through a screw-coupling of the first external thread and the second internal thread;
   a top portion of the third connecting piece is provided with an annular third positioning groove, into which a bottom portion of the upper filter element is hermetically embedded;
   an outer surface of a lower portion of the third connecting piece is provided with a second external thread, the lower portion of the third connecting piece is screwed into the first positioning groove, and the third connecting piece and the first connecting piece are connected through a screw-coupling of the first internal thread and the second external thread;
   an inner surface of the lower portion of the third connecting piece is provided with at least one first sealing ring in a circumferential direction of the third connecting piece, and the first sealing ring is interposed between the inner surface of the lower portion of the third connecting piece and an inner side surface of the first positioning groove close to the axis.

10. The switchable two-stage coalescence separation system according to claim 9, wherein the tube sheet is provided with a plurality of second fixing holes, and a support seat is disposed above each of the second fixing holes;
   the support seat is of cylindrical structure disposed in the vertical direction and opened at two ends, a bottom portion of the support seat is connected to an edge of the second fixing hole, and the support seat has a height of 30 mm to 60 mm;
   an outer surface of the second connecting piece is provided with at least one second sealing ring in a circumferential direction of the second connecting piece, the two-stage filter element is inserted into a corresponding second fixing hole, and the second sealing ring is tightly attached to an inner surface of the support seat.

* * * * *